Aug. 17, 1926.
W. O. SNELLING
1,596,070
MANUFACTURE OF CARBON BLACK
Filed April 23, 1925
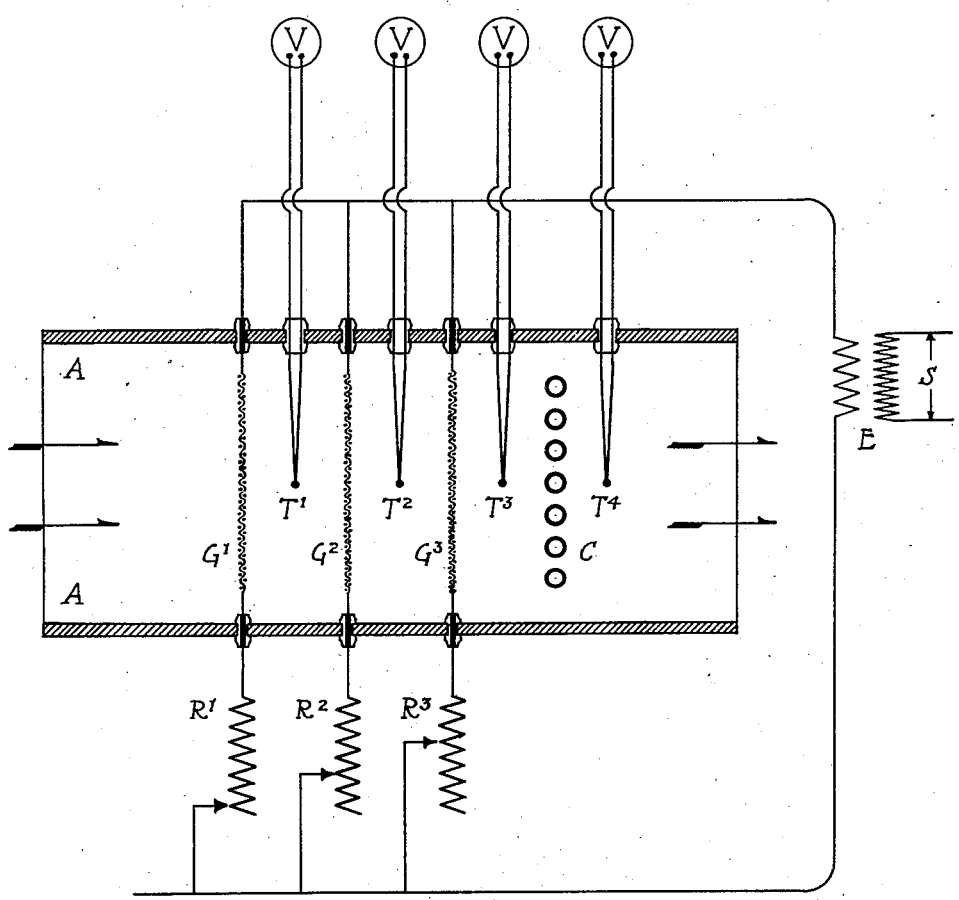
INVENTOR
Walter O. Snelling.

Patented Aug. 17, 1926.

1,596,070

UNITED STATES PATENT OFFICE.

WALTER O. SNELLING, OF ALLENTOWN, PENNSYLVANIA.

MANUFACTURE OF CARBON BLACK.

Application filed April 23, 1925. Serial No. 25,360.

My invention relates to the manufacture of carbon black from natural gas and more particularly relates to improvements in the preparation of carbon black from natural gas by heating natural gas or equivalent hydrocarbons in the absence of free oxygen to a temperature sufficiently high to bring about the decomposition or thermolysis of the hydrocarbons and the separation of solid carbonaceous products.

It has long been known that methane, ethane and their higher homologues decompose upon being heated to a high temperature as by being passed through a tube maintained at a red heat, with the separation of free carbon, solid hydrocarbons and free hydrogen, and such decomposition or thermolysis of natural gas and equivalent hydrocarbons has for a number of years constituted a commercial source of carbon black.

I have discovered that when natural gas or equivalent gaseous or vaporous hydrocarbon is passed through an electrically heated gauze or wire fabric, or an equivalent electrically heated porous membrane, very desirable control of the thermolyzing reaction may be maintained, and a higher yield of carbon black of good quality may be obtained than by the use of such methods of heating as have previously been used.

In the preferred form of my invention, I employ a plurality of wire gauze screens as a means of controlling my thermolyzing reaction, only one of these wire gauze screens being at a temperature sufficient to produce the decomposition of the hydrocarbons. By the heating of my gaseous or vaporous hydrocarbons to a temperature only slightly under their temperature of decomposition, by means of preliminary temperature controlling means, and then passing the preheated gases through a final thermolyzing or decomposing gauze maintained at a temperature sufficiently high to produce the decomposition or breaking down of the hydrocarbons, I obtain flocculent carbon black practically free from graphitic impurities, and which is of much higher grade or quality than has been produced by any previous decomposition process, and which greatly resembles in quality the very high grade carbon black which is produced in the burning or combustion processes of producing carbon black from natural gas.

In the accompanying illustration is shown more or less diagrammatically apparatus such as I may use in the practice of my present invention. In the single figure, shown in vertical section, A is a conduit or passageway of any suitable material and of any convenient shape, and $G^1$, $G^2$ and $G^3$ are membranes of woven wire of wire cloth arranged within the conduit A. E is a transformer, arranged to transform alternating current from a source S to the voltage desired for the heating of the wire gauze membranes $G^1$, $G^2$ and $G^3$. $R^1$, $R^2$ and $R^3$ are variable resistance members, arranged to control the total resistance to the wire gauze unit to which each is attached, thereby permitting control of the temperature of such wire cloth or gauze member. $T^1$, $T^2$, $T^3$ and $T^4$ are thermo-elements or temperature measuring devices of any suitable sort. C is a cooling element, preferably in the form of a series of pipes carrying water or other cooling medium, and shown in the drawing in cross section.

In the preferred practice of my invention natural gas or gaseous or vaporized hydrocarbons of any suitable composition and with or without the admixture of non-hydrocarbon gases or vapors for the purpose of modifying the reaction within the thermolyzing zone, is first passed through gauzes $G^1$ and $G^2$ which are heated to a temperature lower than the decomposition temperature of the hydrocarbons being treated, and the hydrocarbon gases thus preheated are then passed through gauze $G^3$, which is maintained at a temperature higher than the decomposing temperature of at least one of the hydrocarbons present. After passing through gauze $G^3$, and as soon thereafter as possible, the thermolyzed gases and vapors are brought in contact with the cooling element C whereby the temperature is reduced and the production of undesirable graphitic bodies is avoided. The temperature of each gauze is maintained within the desired range of control through the resistance elements $R^1$, $R^2$, etc., as determined by the temperature as indicated by the thermocouples $T^1$, $T^2$, etc. The temperature of the cooling unit C may be controlled in any desired way, as for example by controlling the temperature of the cooling agent admitted to the cooling unit, or by controlling the volume of the cooling agent which is supplied. It is sometimes convenient to use a part or all of the natural gas or other material to be thermolyzed as a cooling agent within the cooling unit C, as thereby a preheating effect is brought about on the natural gas so used as a cooling agent, and the total energy which it is necessary to supply to the thermolyzing unit is reduced through the heat-regenerative effect as established.

It will be evident that one feature of my present invention is the preliminary heating of a hydrocarbon gas to a temperature somewhat under its decomposing temperature by any convenient means, and the passing of such hydrocarbon gas, at a temperature somewhat under its decomposing temperature, through an electrically heated gauze or membrane maintained at a temperature in excess of the decomposition temperature of the hydrocarbon gas. The subsequent prompt cooling of the thermolyzed material is a desirable but not an essential step in my process.

It will be evident that many modifications may be made without departing from the essential features of my invention as herein disclosed. Although a fabric woven from wire forms the most convenient and desirable heating means which I have been able to find, somewhat comparable results may be obtained by employing a grid of closely spaced wires in parallel position and preferably arranged in a single plane. The results obtained from such a grid is not entirely equal to the results obtained from the use of a wire gauze however. A porous membrane may also be employed under certain conditions instead of the use of wire gauze or a wire grid, and I have successfully employed as a substitute for wire gauze a porous plate made of granular carbon as my electrically controlled thermolyzing member. By employing a very thin but quite dense carbon membrane of relatively low porosity, the low mechanical strength of such a thin membrane being corrected by the use of any suitable supporting or reinforcing members, and by employing a relatively high pressure of the hydrocarbon gases on the inlet side of such heating member, and employing reduced pressure on the outlet side of such porous membrane, it is possible to bring about the cooling of the hydrocarbon gases within a very small interval of time after the decomposing reaction has been brought about during the passage of the hydrocarbon gases through the membrane, but the tendency of the membrane to clog from deposited carbon forms an objection to this arrangement, and in general I obtain the best results by the use of wire gauze of sufficiently open structure so that there is no notable difference in pressure on the two sides of such thermolyzing membrane. It will of course be evident that the wires forming my grid or membrane should conveniently be spaced sufficiently close together so that the gas passing through the center of any mesh will be brought up to the thermolyzing temperature, and the use of wire gauze of very coarse mesh is inefficient, and gives less satisfactory yield than when wire gauze of proper mesh is used. I find that wire gauze having openings one-quarter millimeter in size is very suitable in the practice of my invention, although wire gauze having smaller or larger openings may be used with equally satisfactory results if care is taken to insure proper temperature control of the gauze during the thermolyzing reaction.

Although platinum wire is a suitable material for the production of thermolyzing gauze from the standpoint of electrical resistance, the tendency of platinum to be unfavorably affected by carbon is a disadvantage, and in practical work I find the use of nickel-chromium and other resistance alloys to be the most satisfactory materials to use as gauze or grid elements. Although I find that thermocouples form a convenient means of measuring the temperature before and behind my thermolyzing gauze, resistance thermometers or any other type of temperature measuring device may be used with equal success. I may by well known means combine my heat measuring thermocouples with my resistance controlling rheostats so as to provide automatic control of the temperature of my gauze elements, but this represents a convenient but not an essential feature of my invention.

Although I prefer to employ as my preheating means a gauze or grid, or a plurality of gauzes or grids, of the same type or nature as my electrically heated thermolyzing gauze or grid, this is not an essential feature of my invention, and I may preheat my hydrocarbon gases by other means than electrically heated members, but the employment of an electrically heated gauze, grid or membrane is an essential feature of my invention, as I find no other means of heating produces the high grade of carbon black which I obtain by the passing of hydrocarbon gases through a very thin heating zone, which preferably is less than five millimeters in thickness, such as is represented by my electrically heated thermolyzing member.

I claim:

1. The process of making carbon black which comprises passing hydrocarbon gases through a thin electrically heated membrane maintained at a temperature in excess of the decomposition temperature of the hydrocarbon treated.

2. The process of making carbon black which comprises heating hydrocarbon gases to a temperature slightly under their decomposition temperature, and passing such preheated material through an electrically heated membrane maintained at a temperature in excess of the decomposition temperature of the hydrocarbon treated.

3. In the manufacture of carbon black, the process which comprises bringing about the decomposition of hydrocarbon gases and vapors by passing them through an electrically heated zone the thickness of which is very small as compared with its other two dimensions.

4. In the manufacture of carbon black the process which comprises preheating hydrocarbon vapors to a temperature insufficient to produce separation of carbon, and thereafter passing the preheated vapors through an electrically heated fabric maintained at a temperature in excess of the decomposition temperature of the hydrocarbon vapors.

In testimony whereof, I have hereunto subscribed my name this 20th day of April, 1925.

WALTER O. SNELLING.